United States Patent

Yepez

(10) Patent No.: US 9,922,297 B2
(45) Date of Patent: Mar. 20, 2018

(54) QUEUE TECHNIQUES

(71) Applicant: NCR Corporation, Duluth, GA (US)

(72) Inventor: Rafael Yepez, Duluth, GA (US)

(73) Assignee: NCR Corporation, Atlanta, GA (US)

( * ) Notice: Subject to any disclaimer, the term of this patent is extended or adjusted under 35 U.S.C. 154(b) by 504 days.

(21) Appl. No.: 14/606,168

(22) Filed: Jan. 27, 2015

(65) Prior Publication Data

US 2016/0217396 A1   Jul. 28, 2016

(51) Int. Cl.
*G06Q 10/06* (2012.01)
*G06Q 10/02* (2012.01)
*G06Q 10/10* (2012.01)

(52) U.S. Cl.
CPC ..... *G06Q 10/063114* (2013.01); *G06Q 10/02* (2013.01); *G06Q 10/06* (2013.01); *G06Q 10/109* (2013.01)

(58) Field of Classification Search
CPC ........... G06Q 10/02; G06Q 10/063114; G06Q 10/109; G06Q 10/06
USPC ............................................................. 705/5
See application file for complete search history.

(56) References Cited

U.S. PATENT DOCUMENTS

| 6,845,361 | B1 * | 1/2005 | Dowling | G06Q 10/02 705/13 |
| 7,192,235 | B2 | 3/2007 | Blight et al. | |
| 8,527,575 | B2 | 9/2013 | Xiao et al. | |
| 2012/0158934 | A1 * | 6/2012 | Xiao | G06Q 30/02 709/223 |
| 2012/0315868 | A1 * | 12/2012 | Ben-Alexander | G06Q 10/109 455/404.1 |
| 2013/0103486 | A1 * | 4/2013 | Hess | G06Q 30/02 705/14.38 |
| 2014/0096140 | A1 * | 4/2014 | Aquino | G06Q 10/1095 718/103 |
| 2015/0079942 | A1 * | 3/2015 | Kostka | G06O 30/0633 455/411 |
| 2015/0379434 | A1 * | 12/2015 | Argue | G06Q 10/02 705/5 |
| 2016/0027073 | A1 * | 1/2016 | Eramian | G06Q 30/0281 705/346 |

OTHER PUBLICATIONS

Tsuruoka, Doug. "Security Concerns Dog PayPal Beacon Hands-Free Paying EBay Unit Pledges It's Safe Retail shoppers can make purchases without taking out wallet or smartphone." Investor's Business Daily, Oct. 4, 2013. (Year: 2013).*
European Search Report issued in co-pending European Patent Application 15194828.8 dated Jun. 3, 2016.

* cited by examiner

*Primary Examiner* — Kevin H Flynn
*Assistant Examiner* — Hunter A Molnar
(74) *Attorney, Agent, or Firm* — Schwegman, Lundberg & Woessner

(57) ABSTRACT

Queue techniques which use a beacon to detect customers. An example queue method includes receiving a message containing an identifier and contact information from a mobile communication device carried by a customer within communication range of a beacon, establishing a position of the customer in a queue, and sending a reply message to the mobile communication device at the contact information containing queue information.

27 Claims, 3 Drawing Sheets

QUEUE TECHNIQUES

BACKGROUND

The present invention relates to queuing and more specifically to queue techniques.

Queuing is common in venues like restaurants, medical offices, pharmacies, barber shops, government offices, and post offices. In a typical restaurant example, a customer arrives at a sign-in station and leaves a name. The customer may additionally receive a notification device, or may just listen for his name to be called. In other venues, a customer may have to take a ticket with a number and wait for the number to be called.

It would be desirable to provide queue techniques that are more cost-effective.

SUMMARY

In accordance with the teachings of the present invention, queue techniques are provided.

An example queue system includes a beacon for producing a signal, and a queue management system configured to receive a message containing an identifier and contact information from a mobile communication device carried by a customer which has received the signal from the beacon, to establish a position of the customer in a queue, and to send a reply message to the mobile communication device at the contact information containing queue information.

The mobile communication device may be equipped with a mobile application provided by a business serving the queue. The mobile application sends the message to the queue management system and receives the queue information from the queue management system.

Example queue information received by the mobile communication device from the queue management system may include a current position in the queue, an estimated wait time, a number representative of a position in the queue, an alert to the due turn and/or other information.

An example beacon includes a Bluetooth Low Energy (BLE) standard beacon. Other wireless technologies are also envisioned. An example queue system employs one or more beacons.

In an example venue, the beacon is located at a service delivery point, a business entrance, a front desk, or other location where a queue of customers can form.

An example queue method includes receiving a message containing an identifier and contact information from a mobile communication device carried by a customer within communication range of a beacon, establishing a position of the customer in a queue, and sending a reply message to the mobile communication device at the contact information containing queue information.

In another example queue method includes providing a beacon adjacent a queue position, receiving a message from a mobile application of a mobile communication device carried by a customer within communication range of the beacon, wherein the message contains an identifier and contact information, adding the customer to a position in a queue including storing the customer identifier and the contact information in a queue record, and sending a reply message to the mobile application at the contact information containing queue information specific to the customer.

Another example queue method includes receiving a signal from a beacon adjacent a queue position by a mobile communication device carried by a customer, sending a message to a queue management system containing an identifier and contact information, and receiving queue information from the queue management system by the mobile communication device.

While the customer is waiting in the queue, the customer may receive additional messages containing updated queue information, incentives, and helpful information related to the business serving the queue.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION

Figure 1:
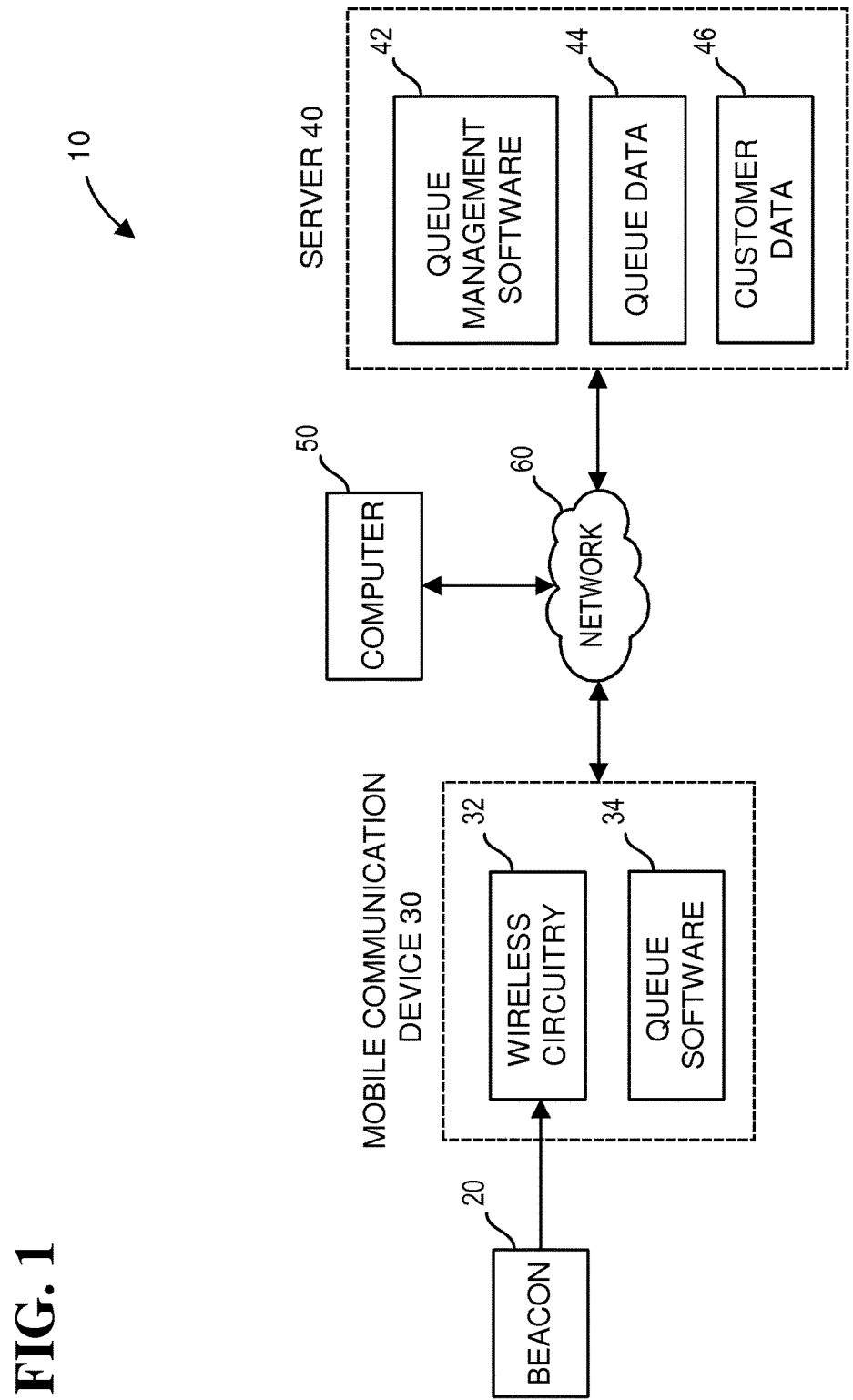
FIG. 1 is a block diagram of a queue system.

With reference to FIG. 1, an example queue system 10 includes a beacon 20 at a business establishment for facilitating interaction and/or communication between the business and its customers. More specifically beacon 10 facilitates communication between a mobile communication device 30 of a customer and a server 40.

Beacon 20 may include a Bluetooth Low Energy (BLE) standard beacon. Beacon 20 transmits a wireless signal, which may include a 2.4 GHz signal. Other types of wireless beacons are also envisioned. One or more beacons 20 in a "geo-fence" may be located at a service delivery point, a business entrance, a front desk, or other location where a queue of customers can form.

Mobile communication device 30 may include a smart phone, smart watch, personal digital assistant, or other portable communication device. Mobile communication device 30 may include one or more processors, memory, program storage, a display, an input device (which may be combined with the display as a touch screen), and cellular and network communication circuitry. Mobile communication device 30 may execute an operating system such as a Microsoft, Google, or Apple operating system. The processor executes software which is stored in a computer readable medium, such as a memory.

Mobile communication device 30 also includes wireless circuitry 32 and executes queue software 34. Wireless circuitry 32 receives signals from beacon 20 when mobile communication device 30 is within communication range of beacon 20. In an example embodiment in which beacon 20 includes BLE circuitry, wireless circuitry 32 is also BLE circuitry.

Queue software 34 may include a native mobile application. The customer causes mobile communication device 30 to download and install queue software 34. Queuing software 34 may also integrate into the calendar or appointment/reminders software of mobile communication device 30. Queuing software 34 may then update such software in real time with the time of appointment and/or turn in the queue and the software may then alert the person waiting in the queue as it would with any other appointment.

Queue software 34 sends a message to server 40 when mobile communication device 30 is within communication range of beacon 20. Queue software 34 determines whether wireless circuitry 32 is receiving signals from beacon 20.

When wireless circuitry 32 is receiving signals from beacon 20, queue software 34 sends a corresponding message to server 40 over network 60 containing a customer identifier, which may include a name or alias.

Queue software 34 may also determine when mobile communication device 30 is no longer within communication range of beacon 20, i.e., leaves the geo-fence or premises. Queue software 34 sends a corresponding message to server 40 over network 60 containing the customer identifier.

In some venues, queue software 34 may send additional information, such as a phone number or an email address, which may also serve as customer identifiers. Queue software 34 may send additional information in the same or additional messages. For example, in some restaurant venues, queue software 34 may send a message containing a customer seating preference and receive a reply message acknowledging the seating request.

In one example embodiment, queue software 34 may both send and receive messages. In another example embodiment, queue software 34 may only detect beacon 20 and send an initial message to server 40. Further communication between mobile communication device 30 and server 40 may then be carried out as a simple message service (text) message addressed to the phone number of mobile communication device 30, as an email message addressed to an email address of the customer, or using other communication features that are built-in to mobile communication device 30.

Regardless, after mobile communication device 30 sends a message to server 40 indicating entry into the geo-fence, mobile communication device 30 receives a reply message from server 40 containing queue information.

In one example embodiment, the queue information is a current position in the queue. In another example embodiment, the queue information is an estimated wait time. In another example embodiment, the queue information is a number.

The reply or subsequent messages from server 40 may also contain other information, such as, advertisements, coupons and other incentives, and helpful information.

Advantageously, a customer with a mobile communication device equipped with queue software 34 is added to the queue automatically. The business establishment may still accept customers without mobile communication devices 30 equipped with queue software 34 and run two queue entry processes, manual and automatic. To encourage use of queue software 34, the business establishment may offer coupons and other incentives.

Server 40 includes one or more processors, memory, and program storage, and may execute an operating system such as a Microsoft or Linux operating system. Server 40 further includes network circuitry for connecting to network 60, and may include other circuitry for connecting to peripherals.

The processor executes software which is stored in a computer readable medium, such as a memory. For example, server 40 may execute web server software and be connected to the World Wide Web (WWW or "web") and provide web content, including web pages. The functions of server 40 may be provided by one or more computers "in the cloud". Server 40 may be located at the business establishment or offsite.

Server 40 executes queue management software 42 which maintains queue data 44 containing the details of the queue. In one example embodiment, queue management software 42 assigns positions in the queue based upon the order that customers are detected by beacon 20, on a "first come, first serve" basis.

In one example embodiment, queue management software 42 may receive a customer identifier from mobile communication device 30.

In another example embodiment, queue management software 42 may additionally determine and store an arrival time of the message.

In some venues, such as some restaurant venues, queue management software 42 may also receive and store customer preferences, for example, seating preferences.

Queue management software 42 may also receive and store a customer phone number or email address that may be used in some venues to send the customer reply messages, including text or email messages, or call or send an additional message to the customer when the customer is first in the queue.

When queue management software 42 receives an initial message from mobile communication device 30, queue management software 42 sends queue information, such as a current position in the queue, an estimated wait time, and/or a number, and may also send, atomically or when requested by the customer, in the same or additional messages, advertisements, coupons and other incentives, and helpful information. For example, in a restaurant, queue management software 42 may send a menu and 'specials' for the day. As another example, queue management software 42 may periodically send an estimated wait time and/or current queue position. As another example, queue management software 42 may automatically send a message to mobile communication device 30 if current position of the customer in the queue is first for service.

Queue management software 42 may wait until a predetermined time period has passed to allow for receipt of another message from mobile communication device 30 indicating departure from the geo-fence before sending the queue information. This may help prevent passers-by from remaining in a queue when they have no intention to stay. Queue management software 42 may alert a user of mobile communication device 30 and solicit a selection to "hold" the position or "cancel" the position as an alternative to assuming that the user is a passer-by.

Similarly, when a user intends to no longer wait in a queue and leaves the geo-fence, queue management software 42 receives a corresponding message from mobile communication device 30 indicating departure from the geo-fence. Queue management software 42 may cancel the corresponding position in the queue following a predetermined time limit. Queue management software 42 may alert the user and solicit a selection to "hold" the position or "cancel" the position as an alternative to assuming that the user intends to leave the queue.

In some venues, queue management software 42 may also serve to process check-in. For this purpose, queue management software 42 maintains customer data 46 obtained during check-in.

In some venues, queue system 10 may also include computer 50, which connects to server 40 to determine the customer who is first in the queue. Computer 50 may execute web browser software for obtaining and viewing queue data 44 within web pages hosted by server 40.

In another embodiment, computer 50 may execute queue management software 42 to view and change queue data 44 through web browser software. Computer 50 may remove a record of the customer from queue data 44 when that customer is being served.

In yet another embodiment, computer 50 may also check that customer in.

In some venues, a digital sign showing all or a portion of the queue, such as the first position of the queue, may be used in addition to or in lieu of a personal computer or portable computing device.

Network 60 may include any combination of wireless or wired networks, including local area, wide area, virtual private, cellular, and global communication networks, such as the Internet.

Figure 2:
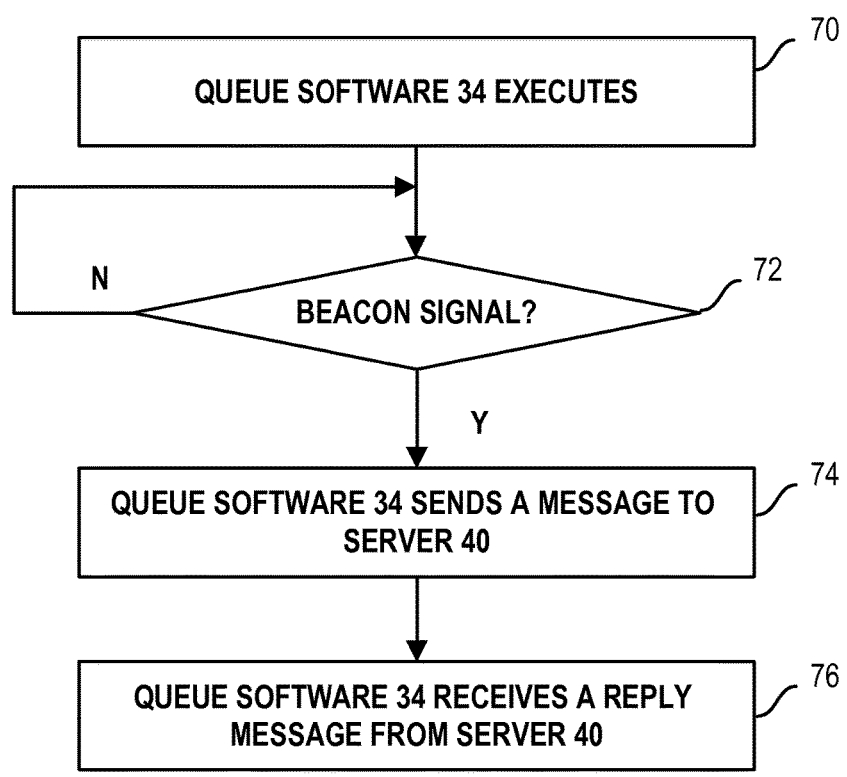
FIG. 2 is a flow diagram illustrating an example queue method.

With reference to FIG. 2, operation of queue software 34 is illustrated in more detail.

In step 70, queue software 34 executes.

Queue software 34 may operate in the background, such as when mobile device 30 is in "sleep" mode, ready to receive prompts from beacon 20.

In step 72, queue software 34 determines that wireless circuitry 32 has received a signal from beacon 20.

In step 74, queue software 34 sends a message to server 40 over network 60 containing a customer identifier and contact information.

Queue management software 42 receives the message and enters the customer identifier in queue data 44. Queue management software 42 further sends queue information, such as the customer's current position, an estimated wait time in the queue, and/or a number, in a reply message.

In step 76, queue software 34 receives the reply message from server 40.

Queue software 34 may send and receive additional information in the same message or other messages. For example, queue software 34 may send a phone number or email address that may be used in some venues as a customer identifier and/or to send the customer a text message or call the customer when the customer reaches the first position in the queue.

Figure 3:
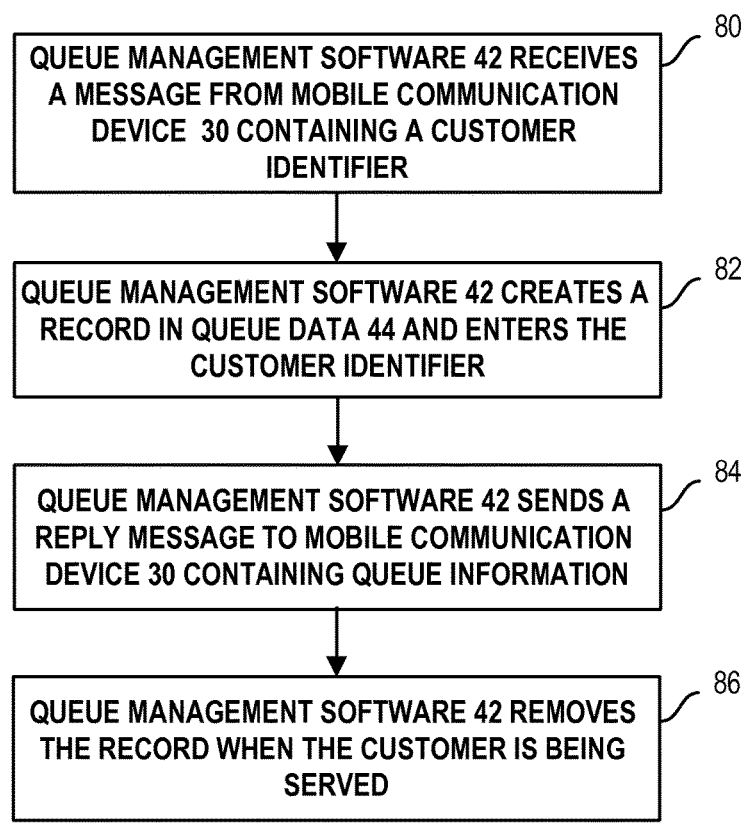
FIG. 3 is a flow diagram illustrating another example queue method.

With reference to FIG. 3, operation of queue management software 42 is illustrated in more detail.

In step 80, queue management software 42 receives a message from mobile communication device 30 containing a customer identifier and contact information, indicative of mobile communication device 30 being in communication range of beacon 20.

In step 82, queue management software 42 creates a record in queue data 44 and enters the customer identifier.

In one example embodiment, queue management software 42 assigns a position in the queue based upon a "first come, first serve" basis.

In some embodiments, queue management software 42 may additionally determine and store an arrival time of the message.

In some embodiments, queue management software 42 may also receive and store a customer phone number or email address.

In step 84, queue management software 42 sends a reply message to mobile communication device 30 containing queue information, such as the customer's current position, an estimated wait time in the queue, and/or a number.

Queue management software 42 may wait until a predetermined time period has passed to allow for receipt of another message from mobile communication device 30 indicating departure from the geo-fence before sending the queue information. This may help prevent passers-by from remaining in a queue when they have no intention to stay. Queue management software 42 may alert a user of mobile communication device 30 and solicit a selection to "hold" the position or "cancel" the position as an alternative to assuming that the user is a passer-by.

In one example embodiment, queue management software 42 sends the reply message directly to queue software 34.

In another example embodiment, queue management software 42 sends the reply message as a text message addressed to the phone number of mobile communication device 30, as an email message addressed to an email address of the customer, or using other communication features that are built-in to mobile communication device 30.

In some embodiments, queue management software 42 may send and receive additional information in the same or additional messages. In some venues, such as some restaurant venues, queue management software 42 may receive and store customer preferences, for example, seating preferences. Queue management software 42 may also send, atomically or when requested by the customer, advertisements, coupons and other incentives, and helpful information. For example, in a restaurant, queue management software 42 may send a menu and 'specials' for the day. As another example, queue management software 42 may periodically send an estimated wait time and/or current queue position. As another example, queue management software 42 may automatically send a message to mobile communication device 30 if current position of the customer in the queue is first for service.

In some venues, the queue management software 42 may also serve to process check-in. Queue management software 42 records and stores customer data required for check-in in customer data 46.

In step 86, queue management software 42 removes a record of the customer from queue data 44 when that customer is being served. Computer 50 may be used for this purpose.

Queue management software 42 may also remove a record of the customer from queue data 44 when that customer leaves the geo-fence intending to leave the queue. Queue management software 42 receives a corresponding message from mobile communication device 30 indicating departure from the geo-fence. Queue management software 42 may cancel the corresponding position in the queue following a predetermined time limit. Queue management software 42 may alert the user and solicit a selection to "hold" the position or "cancel" the position as an alternative to assuming that the user intends to leave the queue.

Although the invention has been described with particular reference to certain preferred embodiments thereof, variations and modifications of the present invention can be effected within the spirit and scope of the following claims.

What is claimed is:

1. A queue method comprising:
    receiving, by a server, a message directly from a mobile application processing on a mobile communication device carried by a customer when the mobile communication device is within communication range of a beacon, wherein the message includes an identifier and contact information, and wherein the mobile application detects a wireless signal emitted by the beacon within a geofenced area and automatically sends the message directly to the server in response to detecting the wireless signal from the beacon within the geofenced area;
    establishing, by the server, a position of the customer in a queue, wherein establishing further includes automatically assigning the position of the customer in the queue in response to receiving the message; and
    sending, by the server, a reply message directly to the mobile communication device at the contact information containing queue information as a text message in response to establishing the position.

2. The method of claim 1, wherein the identifier comprises a name.

3. The method of claim 1, wherein the contact information comprises a phone number.

4. The method of claim 1, wherein the contact information comprises an email address.

5. The method of claim 1, wherein establishing comprises creating a record containing the identifier and the contact information.

6. The method of claim 1, wherein establishing comprises determining an initial position of the customer based upon a time of receipt of the message.

7. The method of claim 1, wherein the queue information comprises a current position in the queue.

8. The method of claim 1, wherein the queue information comprises an estimated wait time.

9. The method of claim 1, wherein the queue information comprises a number.

10. The method of claim 1, further comprising sending another message to the mobile communication device containing updated queue information.

11. The method of claim 1, further comprising sending another message to the mobile communication device containing incentives.

12. The method of claim 1, further comprising sending another message to the mobile communication device containing information related to a business serving the queue.

13. The method of claim 1, further comprising sending another message to the mobile communication device when the customer is first for service in the queue.

14. The method of claim 1, further comprising removing the customer record from the queue when the customer is being served.

15. The method of claim 1, further comprising completing a check-in process.

16. A queue method comprising:
providing a beacon adjacent a queue position;
receiving, by a server, a message directly from a mobile application of a mobile communication device carried by a customer when the mobile communication device is within communication range of the beacon, wherein the message contains an identifier and contact information, and wherein the mobile application detects a wireless signal emitted by the beacon within a geofenced area and automatically sends the message directly to the server within the geofenced area;
adding, by the server, the customer to a position in a queue by assigning the customer to the position within the queue in response to receiving the message, including storing the customer identifier and the contact information in a queue record; and
sending, by the server, a reply message directly to the mobile application at the contact information containing queue information specific to the customer as a text message to the mobile communication device in response to adding the customer to the position.

17. The method of claim 16, further comprising sending another message to the mobile communication device containing incentives.

18. The method of claim 16, further comprising sending another message to the mobile application when the customer is first for service in the queue.

19. A queue method comprising:
receiving, by a mobile application processing on a mobile communication device carried by a customer, a signal from a beacon adjacent a queue position, the beacon emitting the signal within a geofenced area for which the mobile communication device has entered for receiving the signal;
automatically sending, by the mobile communication device, a message directly to a queue management system processing on a server, wherein the message includes an identifier and contact information in response to the mobile communication device receiving the signal within the geofenced area; and
receiving, by the mobile communication device, queue information directly from the queue management system of the server as a text message sent directly from the server to the mobile communication device.

20. The method of claim 19, wherein the queue information comprises a current position in the queue.

21. The method of claim 19, wherein the queue information comprises an estimated wait time.

22. The method of claim 19, wherein the queue information comprises a number.

23. The method of claim 19, further comprising receiving another message from the queue management system by the mobile communication device containing updated queue information.

24. The method of claim 19, further comprising receiving another message from the queue management system by the mobile communication device containing incentives.

25. The method of claim 19, further comprising receiving another message from the queue management system by the mobile communication device when the customer is first for service in the queue.

26. The method of claim 19, wherein a mobile application provided by a business serving the queue sends the message to the queue management system and receives the queue information from the queue management system.

27. A queue system comprising:
a beacon for producing a signal within a geofenced area; and
a server including a queue management system configured to
receive a message from a mobile application processing on a mobile communication device that is carried by a customer when the mobile communication device is within communication range of a beacon, wherein the message includes an identifier and contact information, and wherein the mobile application detects the signal from the beacon within a geofenced area and automatically sends the message directly to the queue management system on the server in response to receiving the signal within the geofenced area;
establish a position of the customer in a queue and automatically assign the customer to the position in the queue in response to receipt of the message; and
send a reply message directly from the server to the mobile communication device at the contact information containing queue information as a text message in response to establishment of the position of the customer within the queue.

* * * * *